Aug. 20, 1935.　　　F. R. JOHNSTON　　　2,011,766
AUTOMOBILE LIFT
Original Filed Aug. 20, 1934
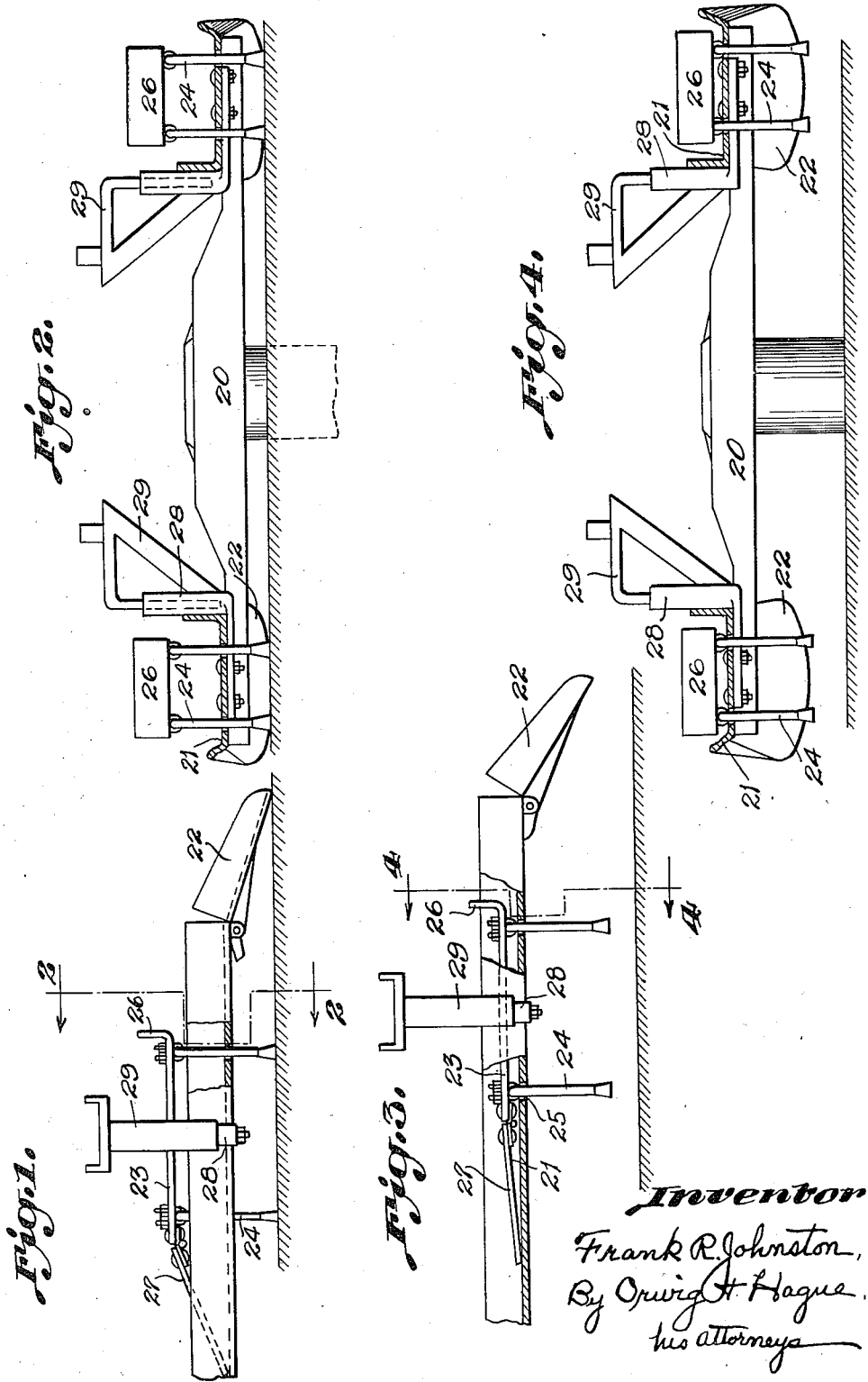
Inventor
Frank R. Johnston,
By Orwig H. Hague.
his attorneys Patented Aug. 20, 1935

2,011,766

UNITED STATES PATENT OFFICE 2,011,766

AUTOMOBILE LIFT

Frank R. Johnston, Des Moines, Iowa, assignor to Globe Machinery & Supply Company, Des Moines, Iowa, a corporation of Iowa Original application August 20, 1934, Serial No. 740,598. Divided and this application November 8, 1934, Serial No. 751,988

4 Claims. (Cl. 254—89)

The subject matter of this application has been divided out of my application filed August 20, 1934, Serial Number 740,598, patented May 28, 1935, as Patent No. 2,002,578.

In the art of automobile lifts there are two general types, one known as the "roll on" type and the other as the "free wheeling" type. Both devices have certain advantages and disadvantages.

The object of my invention is to provide a device of simple, durable and inexpensive construction which may be used as an attachment to be applied to automobile lifts of the "roll on" type, and when the lift is elevated, to automatically move an automobile chassis on the lift to position for freeing the wheels from the wheel supporting members to thereby obtain the advantages of a "free wheeling" lift and at the same time retain all the advantages of a "roll on lift."

More specifically, it is my object to provide a device of this character in which, when the automobile wheels are automatically freed from contact with the wheel supporting members, and in position so that the operator may service the wheels as in a "free wheeling" lift, the automobile wheels are, when in said position, only slightly slightly spaced above the wheel supporting members so that in the event that for any reason the automobile should be tilted laterally relative to the lift, the wheels would enter the wheel retaining members and prevent the automobile from falling off of the lift.

My invention consists in the construction, arrangement and combination of the various parts of the device, whereby the objects contemplated are attained, as hereinafter more fully set forth, pointed out in my claims, and illustrated in the accompanying drawing, in which:

Figure 1 shows a side elevation of a portion of an automobile lift of the "roll on" type having my improved wheel freeing device applied thereto, a portion of the wheel supporting member being shown in section.

Figure 2 shows a vertical sectional view taken on the line 2—2 of Figure 1.

Figure 3 shows a view similar to that shown in Figure 1 with the lift in an elevated position, to illustrate the wheel freeing member in its lowered position; and Figure 4 shows a vertical sectional view on the line 4—4 of Figure 3.

Referring to the accompanying drawing, I have used the reference numeral 20 to indicate generally the main frame of an automobile lift of the kind now in common use. The lift is provided with the usual trough shaped wheel supporting members 21, and at the ends thereof there are the usual approach ramps 22.

My improved wheel freeing device which may be used as an attachment for an automobile lift of this type, comprises a wheel engaging plate 23, having attached to its under surface four supporting legs 24 which extend downwardly through the openings 25 in the wheel supporting member of the lift. At one end of the wheel engaging plate 23 is an upturned wheel stop member 26, and pivoted to the end of the wheel engaging plate 23 opposite from the stop 26, is a ramp 27, the free end of which slidingly rests upon the top surface of the wheel supporting member 21.

For the purpose of engaging and supporting an automobile axle above the lift I have provided on each of the wheel supporting members a socket member 28, the lower end of which extends under the adjacent wheel supporting member 21, and is secured thereto by bolts, or the like; and detachably mounted in each socket 28 is an axle engaging member 29 having a downwardly extended portion 30 to enter the socket 28. These axle engaging members are freely detachable and removable so that different brackets may be employed for different kinds of automobiles.

In practical operation with my improvement, and assuming that the automobile lift is in the position shown in Figure 1, then the wheel engaging plate 23 is held in an elevated position relative to the wheel supporting member 21, because of the legs 24 engaging the floor. When in this position the ramp 27 is inclined downwardly and its free end engages the top surface of the wheel engaging member. When the automobile is driven upon the lift its front wheels will move upwardly over the ramps 27 and upon the wheel supporting plate 23, and its further advance movement will be stopped by the stop members 26, and when the front wheels are in this position the axle engaging member 29 will be directly beneath the axle of the automobile, but not in engagement therewith. Then, when the lift is elevated, the weight of the automobile resting upon the wheel supporting plates 23 will hold said plates stationary, while the wheel supporting members 21 move upwardly, and this operation continues until the plates 23 are in their lowered position, as shown in Figure 3; and when in this position, the axle engaging members 29 will have engaged the automobile axle and the wheel engaging plates will have moved out of contact with the wheels, thus freeing them so that they may be serviced in the same manner as wheels may be serviced on the so-called "free wheeling" lift. Then, when the lift is moved downwardly the wheel supporting plate is again elevated to the position shown in Figure 1, so that this action of moving the automobile wheels to and from a free wheeling position is entirely automatic.

Another advantage of my invention is, that when the lift is elevated far enough so that an automobile thereon may be serviced conveniently by an operator from beneath the lift, there is an improved safety feature, in that by having the wheel supporting troughs 21 spaced apart only slightly beneath the wheels, these wheel supporting troughs 21 will engage and hold the automobile against tipping off of the lift if for any reason it should become tilted and tend to slide off.

I claim as my invention:

1. The combination with an automobile lift of the "roll on" class and having a trough shaped wheel supporting member, of a wheel engaging plate mounted above the wheel supporting member of the lift, and legs for the wheel engaging plate extended downwardly and of such length as to engage a floor and thereby hold the wheel supporting plate elevated above the wheel supporting member when the lift is in lowered position.

2. The combination with an automobile lift of the "roll on" class and having a trough shaped wheel supporting member, of a wheel engaging plate mounted above the wheel supporting member of the lift, legs for the wheel engaging plate extended downwardly and of such length as to engage a floor and thereby hold the wheel supporting plate elevated above the wheel supporting member when the lift is in lowered position, and a ramp hinged to the wheel engaging plate and slidingly supported upon the wheel supporting member.

3. The combination with an automobile lift of the "roll on" class and having a trough shaped wheel supporting member, of a wheel engaging plate mounted above the wheel supporting member of the lift, legs for the wheel engaging plate extended downwardly and of such length as to engage a floor and thereby hold the wheel supporting plate elevated above the wheel supporting member when the lift is in lowered position, a ramp hinged to the wheel engaging plate and slidingly supported upon the wheel supporting member, and an upwardly extended wheel stop at the other end of the wheel supporting plate.

4. In an automobile lift, the combination of a frame, a "roll on" runway carried by the frame, a wheel supporting plate above the runway and capable of up and down movement from a position close to the runway to a position elevated above the runway; means connected to said plate for supporting it in its elevated position when the runway is in its lowered position, and an axle engaging jack carried by the frame.

FRANK R. JOHNSTON.